(12) United States Patent
Pan et al.

(10) Patent No.: US 9,062,823 B2
(45) Date of Patent: Jun. 23, 2015

(54) ADJUSTABLE STAND MECHANISM FOR ELECTRONIC DEVICE

(75) Inventors: Lin-Lin Pan, Shenzhen (CN); Chia-Te Yu, New Taipei (TW); Liang-Yi Lu, New Taipei (TW)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 214 days.

(21) Appl. No.: 13/541,772

(22) Filed: Jul. 5, 2012

(65) Prior Publication Data

US 2013/0299663 A1    Nov. 14, 2013

(30) Foreign Application Priority Data

May 14, 2012    (CN) .......................... 201210147498.5

(51) Int. Cl.
*A47G 29/00*    (2006.01)
*F16M 11/10*    (2006.01)
*F16M 11/38*    (2006.01)
*F16M 13/00*    (2006.01)

(52) U.S. Cl.
CPC ............... *F16M 11/10* (2013.01); *F16M 11/38* (2013.01); *F16M 13/00* (2013.01)

(58) Field of Classification Search
CPC .... A47B 23/04; A47B 23/042; A47B 23/043; A47B 23/044; A47B 23/001; A47B 23/004
USPC .............. 248/441.1, 447, 454, 455, 460, 465, 248/464, 571, 472, 139, 172, 371, 188.2, 248/188.6, 188.7, 188.8, 465.1, 469, 463, 248/136, 654.6, 448, 457
See application file for complete search history.

(56) References Cited

U.S. PATENT DOCUMENTS

| | | | | | |
|---|---|---|---|---|---|
| 377,282 | A | * | 1/1888 | Wiederer | 248/471 |
| 1,197,351 | A | * | 9/1916 | Dalglish | 248/464 |
| 1,203,659 | A | * | 11/1916 | Smith | 248/456 |
| 1,457,458 | A | * | 6/1923 | Plamondon | 248/455 |
| 2,428,519 | A | * | 10/1947 | Gustafson | 248/454 |
| 2,576,993 | A | * | 12/1951 | Bergevin | 248/453 |
| 2,713,947 | A | * | 7/1955 | Foster | 211/85.1 |
| 3,126,664 | A | * | 3/1964 | Gibson | 248/463 |
| 3,360,226 | A | * | 12/1967 | Clemens | 248/455 |
| 3,460,795 | A | * | 8/1969 | Dahlin | 248/452 |
| 4,146,308 | A | * | 3/1979 | Cohen | 359/865 |
| 4,483,505 | A | * | 11/1984 | Dalbo | 248/447 |
| 4,605,193 | A | * | 8/1986 | Kuparinen | 248/460 |
| 5,639,053 | A | * | 6/1997 | Dmitriev | 248/460 |
| 5,765,799 | A | * | 6/1998 | Weber | 248/453 |
| 6,776,385 | B1 | * | 8/2004 | Chang | 248/448 |
| 7,252,279 | B2 | * | 8/2007 | Conibear | 248/447 |

(Continued)

*Primary Examiner* — Kimberly Wood
(74) *Attorney, Agent, or Firm* — Novak Druce Connolly Bove + Quigg LLP

(57) ABSTRACT

An exemplary adjustable stand mechanism for supporting an electronic device includes a holding member for holding the electronic device and a support member for supporting the holding member at a selected one of different inclined angles. The support member includes a first stand rotatably engaged with the holding member, and a second stand also rotatably engaged with the holding member. The first stand selectably supports the holding member and provides a first inclined angle for the holding member. The second stand selectably supports the holding member and provides a second inclined angle for the holding member which is different from the first inclined angle.

14 Claims, 11 Drawing Sheets

(56) References Cited

U.S. PATENT DOCUMENTS 7,540,466 B2 *  6/2009  Yang .............................. 248/688
8,534,634 B2 *  9/2013  Hu et al. ....................... 248/371
2009/0283654 A1 * 11/2009  Hu ................................ 248/448

* cited by examiner

# ADJUSTABLE STAND MECHANISM FOR ELECTRONIC DEVICE

BACKGROUND

1. Technical Field

The present disclosure relates to stands for electronic devices.

2. Description of Related Art

Some electronic devices, such as tablet personal computers, are equipped with stands to support the electronic devices on a desktop or tabletop. However, many stands are not adjustable. For example, the stand folds out to a single predetermined inclined angle with respect to the electronic device. Therefore the viewing angle of the electronic device for different users cannot be conveniently changed.

What is needed is to provide a means that can overcome the above-described limitations.

BRIEF DESCRIPTION OF THE DRAWINGS

The components in the drawings are not necessarily drawn to scale, the emphasis instead placed upon clearly illustrating the principles of at least one embodiment. In the drawings, like reference numerals designate corresponding parts throughout the various views, and all the views are schematic.

DETAILED DESCRIPTION

Reference will be made to the drawings to describe certain exemplary embodiments of the present disclosure.

Figure 1:
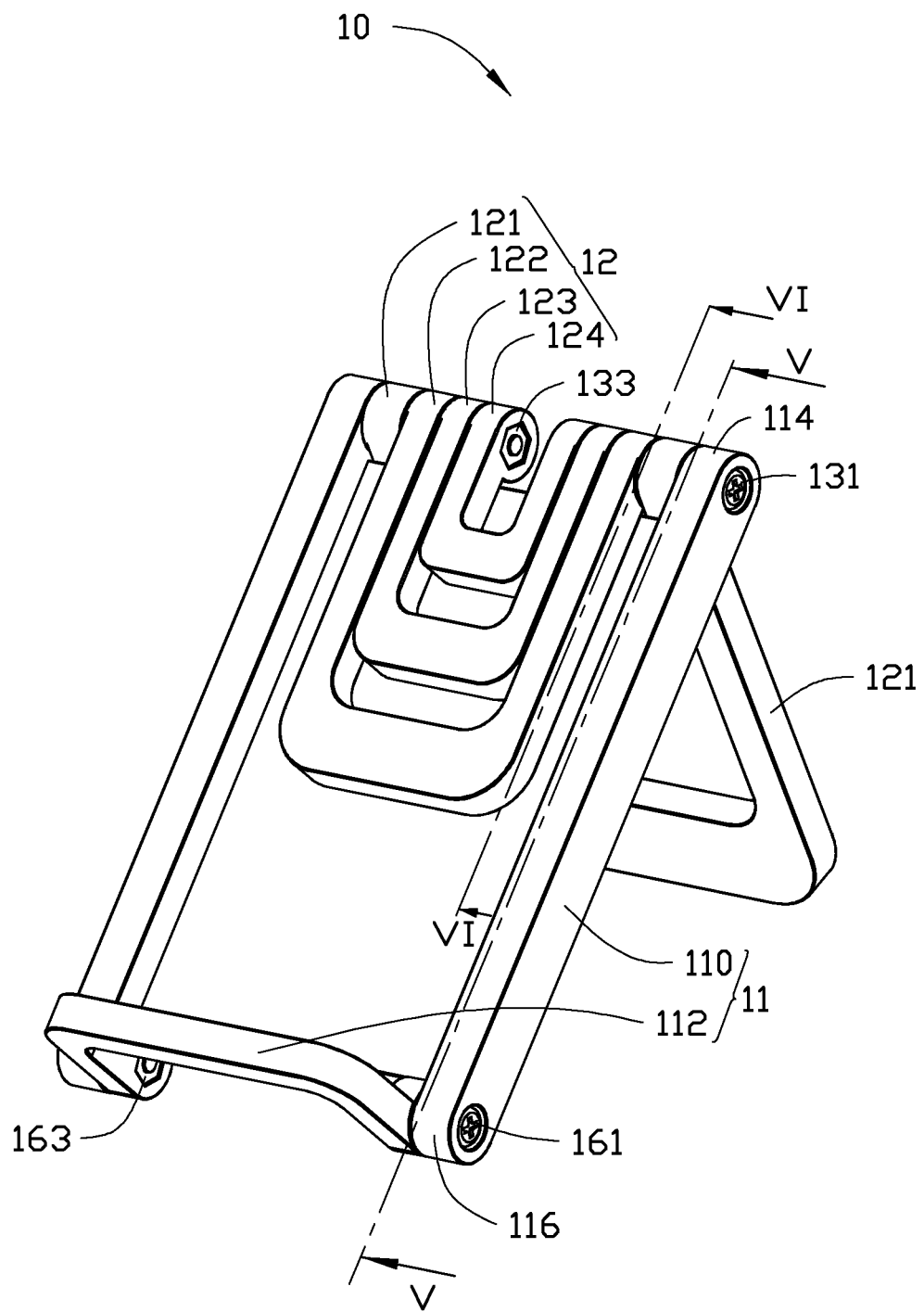
FIG. 1 is an assembled view of an adjustable stand mechanism according to an exemplary embodiment of the present disclosure, showing the adjustable stand mechanism in a first supporting state.
Figure 2:
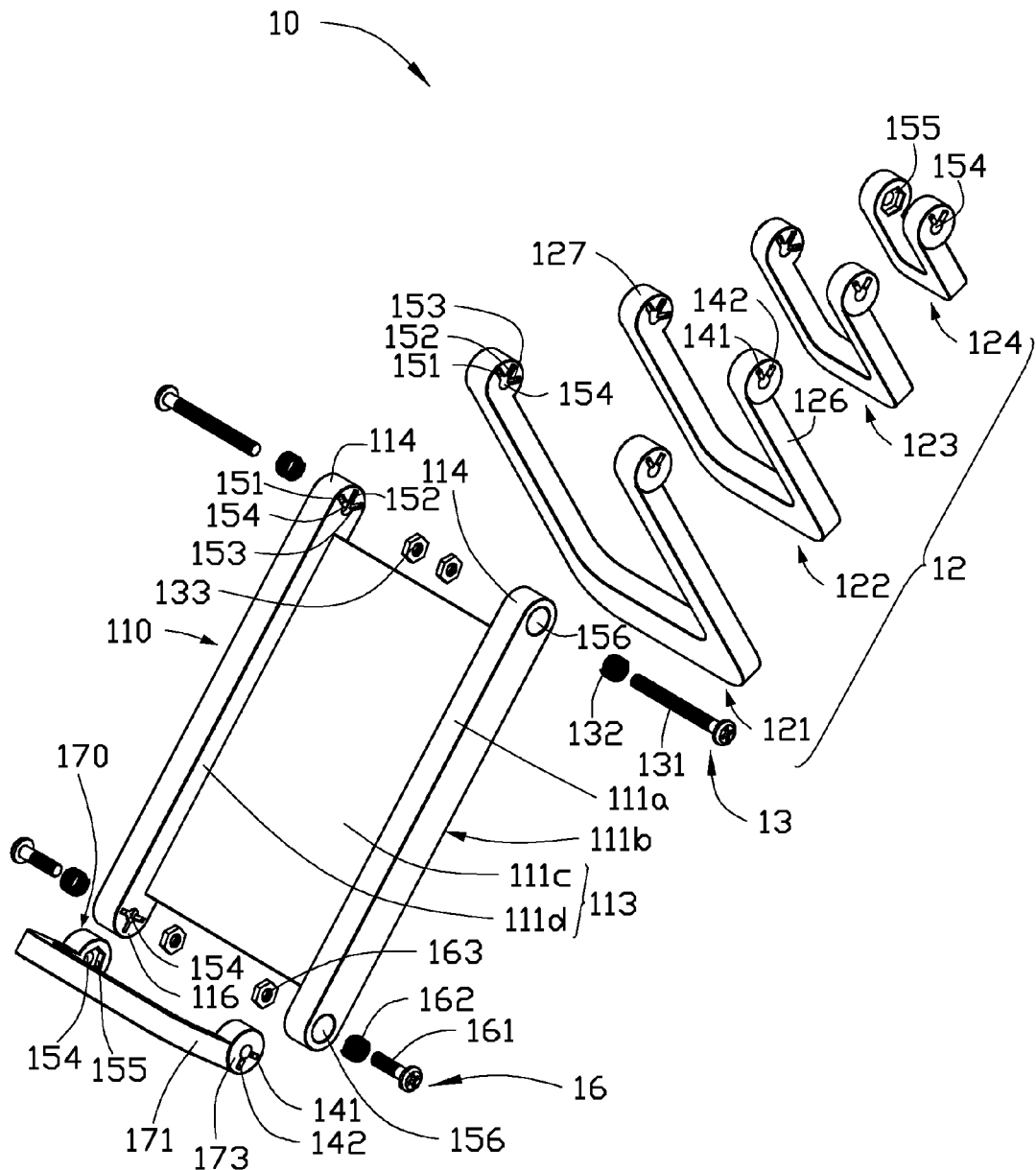
FIG. 2 is an exploded, isometric view of the adjustable stand mechanism of FIG. 1.

An exemplary embodiment of the present disclosure provides an adjustable stand mechanism 10 for an electronic device. Referring to FIG. 1 and FIG. 2, the adjustable stand mechanism 10 includes a holding member 11 configured for holding an electronic device, and a support member 12 configured for supporting the holding member 11. The support member 12 provides at least two inclined angles for the holding member 11, such that the holding member 11 provides at least two inclined angles for holding the electronic device. In the embodiment illustrated, the support member 12 provides four inclined angles for the holding member 11.

Figure 3:
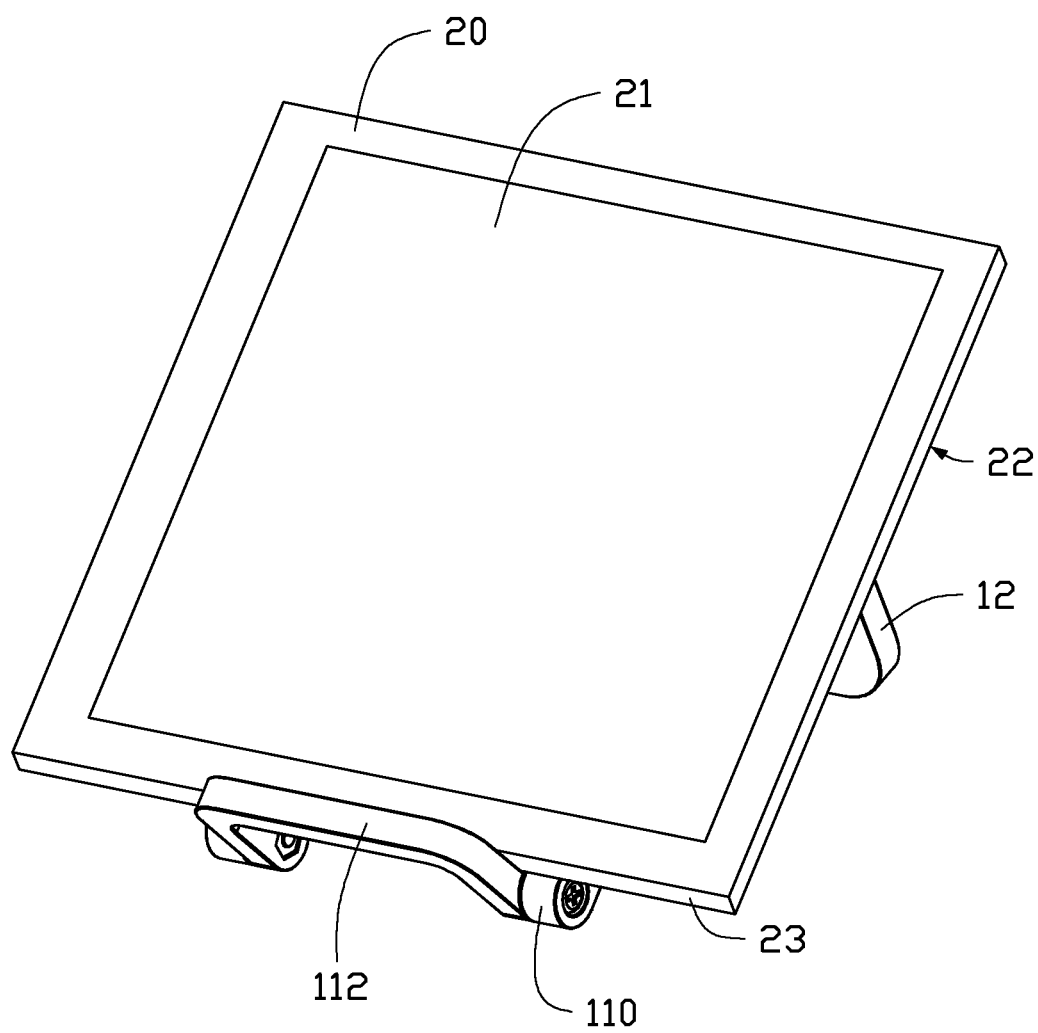
FIG. 3 is a front isometric view of the adjustable stand mechanism of FIG. 1 supporting an electronic device.
Figure 4:
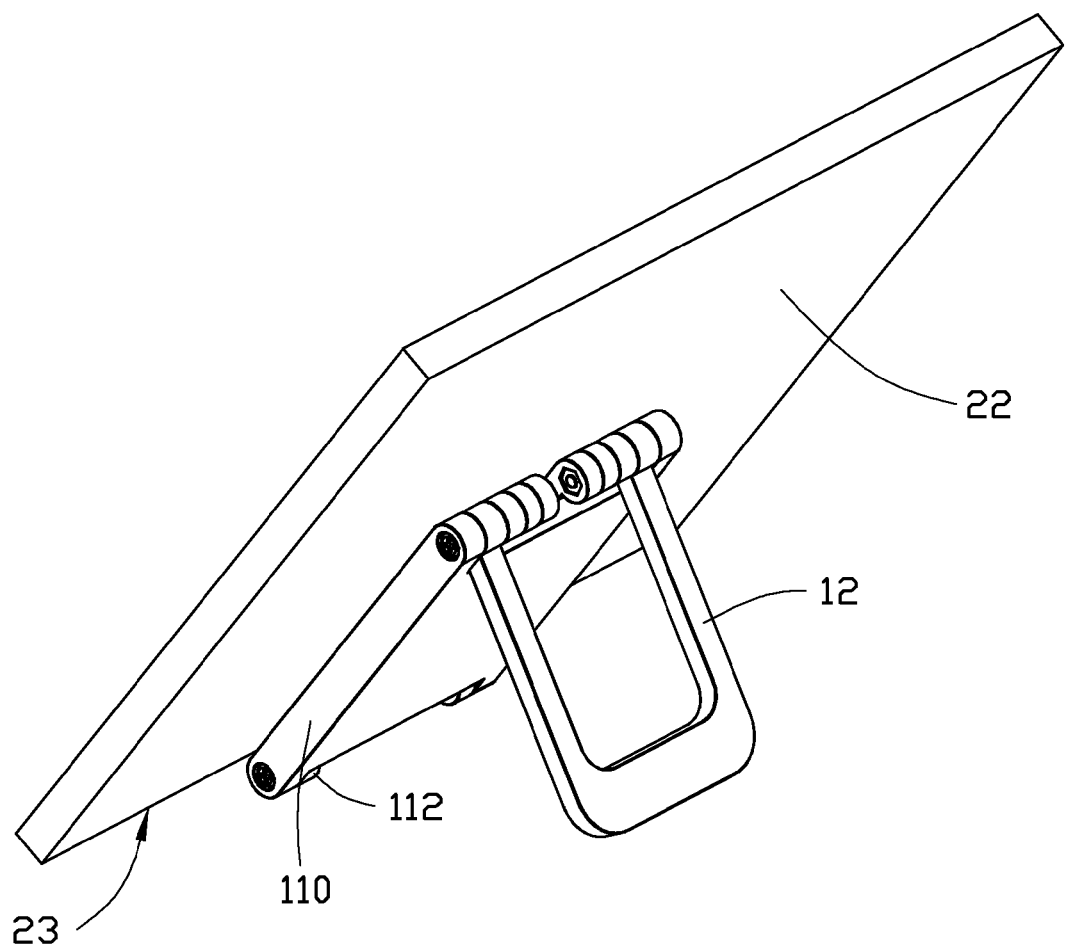
FIG. 4 is a rear isometric view of the adjustable stand mechanism and electronic device of FIG. 3.

Referring also to FIG. 3 and FIG. 4, the electronic device 20 can be a tablet personal computer, which includes a front display surface 21, a rear surface 22, and a bottom end 23 connected between the display surface 21 and the rear surface 22. The holding member 11 includes a holding plate 110, and a footstand 112 engaged with the holding plate 110. The holding plate 110 supports the rear surface 22 of the electronic device 20, and the footstand 112 supports the bottom end 23 of the electronic device 20 for preventing the electronic device 20 from sliding away from the holding plate 110.

The holding plate 110 includes two supporting legs 116 at two bottom corners thereof, and two first engagement portions 114 at two top corners thereof. The holding plate 110 also includes a front supporting surface 111a and a rear surface 111b. A recess portion 113 is defined at the supporting surface 111a. The recess portion 113 includes a bottom surface 111c, and two connection surfaces 111d connected with opposite long sides of the bottom surface 111c. The two first engagement portions 114 face each other, and each first engagement portion 114 includes a pivot hole 154. The two supporting legs 116 face each other, and each supporting leg 116 includes a pivot hole 154.

The support member 12 includes a first stand 121, a second stand 122, a third stand 123, a fourth stand 124, two first shafts 13, two first springs 132, and two first nuts 133. The four stands 121, 122, 123, and 124 are rotatably engaged with the first engagement portions 114 via the two shafts 13. The four stands 121, 122, 123, and 124 have different sizes, such that the stands 121, 122, 123, and 124 provide four different inclined angles for the holding member 11. In detail, a length of each stand 121, 122, 123, and 124 along a supporting direction of the stand 121, 122, 123, and 124 is different from a length of each of the other three stands 122, 123, 124, and/or 121 along the supporting direction of each of the other three stands 122, 123, 124, and/or 121.

Each stand 121, 122, 123, and 124 includes a first U-shaped main body 126, and two second engagement portions 127 integrally formed with two top ends of the first U-shaped main body 126. Each second engagement portion 127 includes a pivot hole 154. In the present embodiment, each first shaft 13 is a first bolt 131. The first bolt 131 passes through the corresponding first spring 132, the pivot hole 154 of the corresponding first engagement portion 114, the corresponding pivot hole 154 of the first stand 121, the corresponding pivot hole 154 of the second stand 122, the corresponding pivot hole 154 of the third stand 123, and the corresponding pivot hole 154 of the fourth stand 124 in series. The first spring 132 is disposed between a head of the first bolt 131 and the first engagement portion 114, and a corresponding one of the first nuts 133 is fixed at the end of the threaded portion of the first bolt 131.

The footstand 112 includes a rest 170, two second shafts 16, two second springs 162, and two second nuts 163. The rest 170 is rotatably engaged with the supporting legs 116 via the two second shafts 16. The rest 170 includes a second U-shaped main body 171, and two third engagement portions 173 integrally formed with two bottom ends of the second U-shaped main body 171. Each third engagement portion 173 includes a pivot hole 154. In the present embodiment, each second shaft 16 is a second bolt 161. The second bolt 161 passes through the corresponding second spring 162, the pivot hole 154 of the corresponding supporting leg 116, and the corresponding pivot hole 154 of the third engagement portion 173 in series. The second spring 162 is disposed between a head of the second bolt 161 and the supporting leg 116, and a corresponding one of the second nuts 163 is fixed at the end of the threaded portion of the second bolt 161.

A first groove 151, a second groove 152, and a third groove 153 are formed at an internal surface of each first engagement portion 114, each supporting leg 116, and each second engagement portion 127 of the first, second, and third stands 121, 122 and 123. The three grooves 151, 152 and 153 are located around the corresponding pivot hole 154, and radiate from the pivot hole 154. A first protrusion 141 and a second protrusion 142 are formed at an external surface of each second engagement portion 127 and each third engagement portion 173.

A first recess 155 is formed at an internal surface of each second engagement portion 127 of the fourth stand 124 and each third engagement portion 173 of the rest 170. Each first nut 133 is received in the first recess 155 of the corresponding second engagement portion 127 of the fourth stand 124. Each second nut 163 is received in the first recess 155 of the corresponding third engagement portion 173 of the rest 170. A second recess 156 is formed at an external surface of each first engagement portion 114 and each supporting leg 116. The head of each first bolt 131 and the corresponding first spring 132 are received in the second recess 156 of the corresponding first engagement portion 114. The head of each second bolt 161 and the corresponding second spring 162 are received in the second recess 156 of the corresponding supporting leg 116.

Each stand 121, 122, 123 and 124 can be positioned in a supporting state or a folded state. Each stand 121, 122, 123 and 124 turns around the first shafts 13 to change its state between the supporting state and the folded state. In the folded state, the stand 121, 122, 123 and 124 is folded up and received in the recess portion 113 of the holding plate 110. In the supporting state, the stand 121, 122, 123 and 124 is unfolded out for supporting the holding member 11.

Further, the rest 170 also can be positioned in a supporting state and a folded state. The rest 170 turns around the second shafts 16 to change its state between the supporting state and the folded state. In the folded state, the rest 170 is folded up and received in the recess portion 113 of the holding plate 110. In the supporting state, the rest 170 is unfolded out for supporting the bottom end 23 of the electronic device 20.

Figure 5:
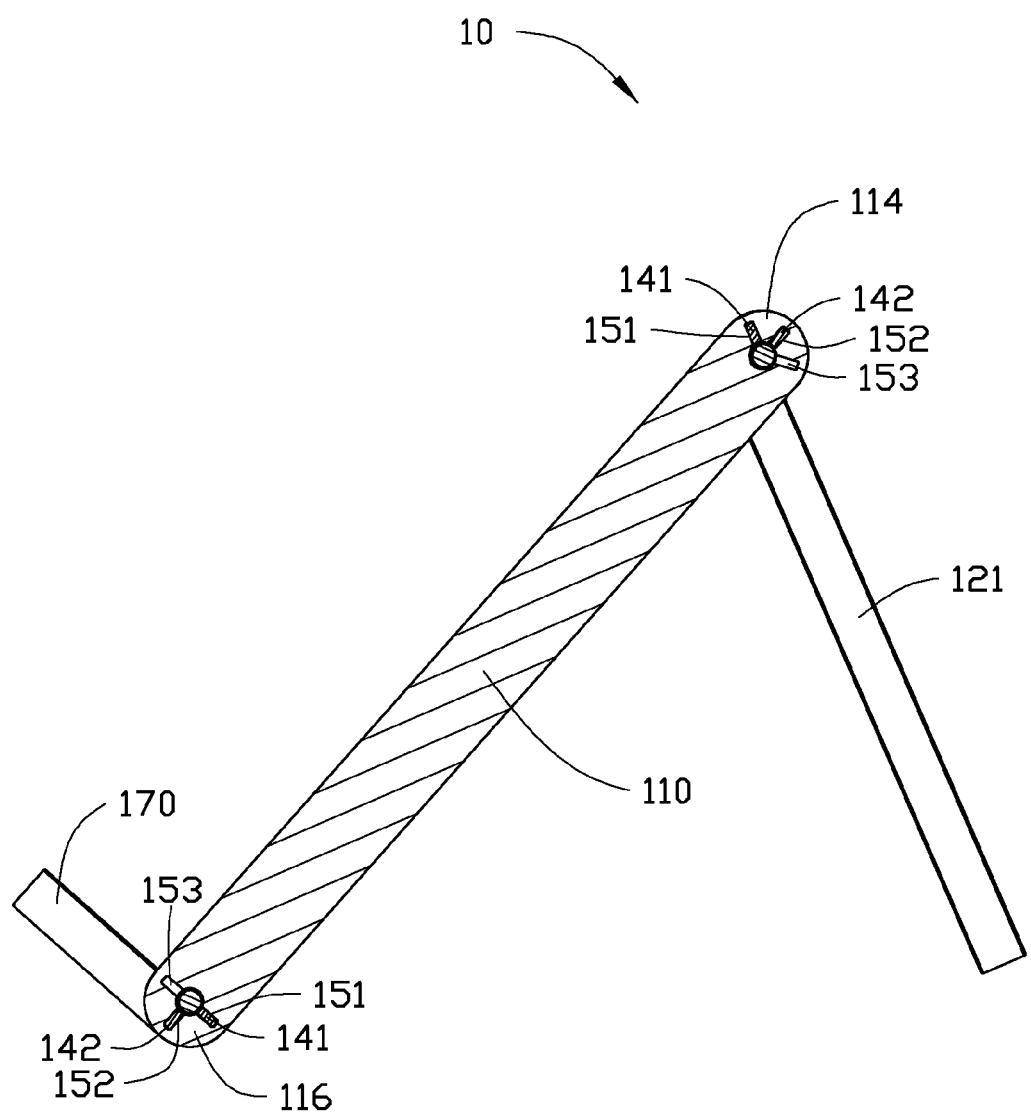
FIG. 5 is a side plan, cutaway view of the adjustable stand mechanism of FIG. 1, corresponding to line V-V thereof.

Referring to FIG. 1, when the adjustable stand mechanism 10 is in a first supporting state, each of the first stand 121 and the rest 170 is in the supporting state, and the other three stands 122, 123 and 124 are in the folded state. That is, the first stand 121 is unfolded out and supports the holding member 11, such that the holding member 11 provides a first inclined angle for the electronic device 20. Moreover, referring also to FIG. 5, the first protrusion 141 of each second engagement portion 127 of the first stand 121 is received in the first groove 151 of the corresponding first engagement portion 114, and the second protrusion 142 of the second engagement portion 127 of the first stand 121 is received in the second groove 152 of the corresponding first engagement portion 114. The first protrusion 141 of each third engagement portion 173 is received in the first groove 151 of the corresponding supporting leg 116, and the second protrusion 142 of the third engagement portion 173 is received in the second groove 152 of the corresponding supporting leg 116.

Figure 6:
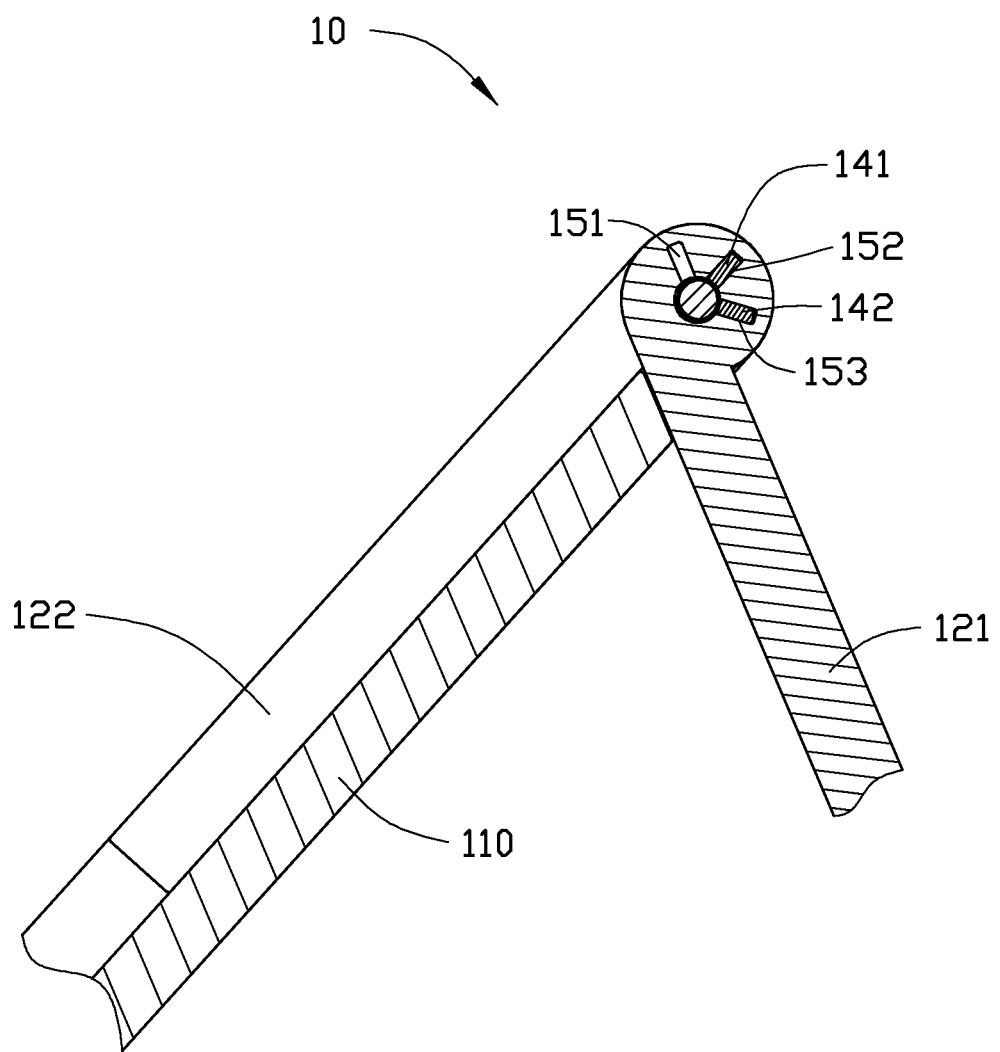
FIG. 6 is a side plan, cutaway view of part of the adjustable stand mechanism of FIG. 1, corresponding to line VI-VI thereof.

Referring to FIG. 6, each second groove 152 of the first stand 121 receives the corresponding first protrusion 141 of the second stand 122, and each third groove 153 of the first stand 121 receives the corresponding second protrusion 142 of the second stand 122. Moreover, the first protrusions 141 of the third stand 123 and the fourth stand 124 are received in the first grooves 151 of the second stand 122 and the third stand 123 respectively, and the second protrusions 142 of the third stand 123 and the fourth stand 124 are received in the second grooves 152 of the second stand 122 and the third stand 123 respectively.

Figure 7:
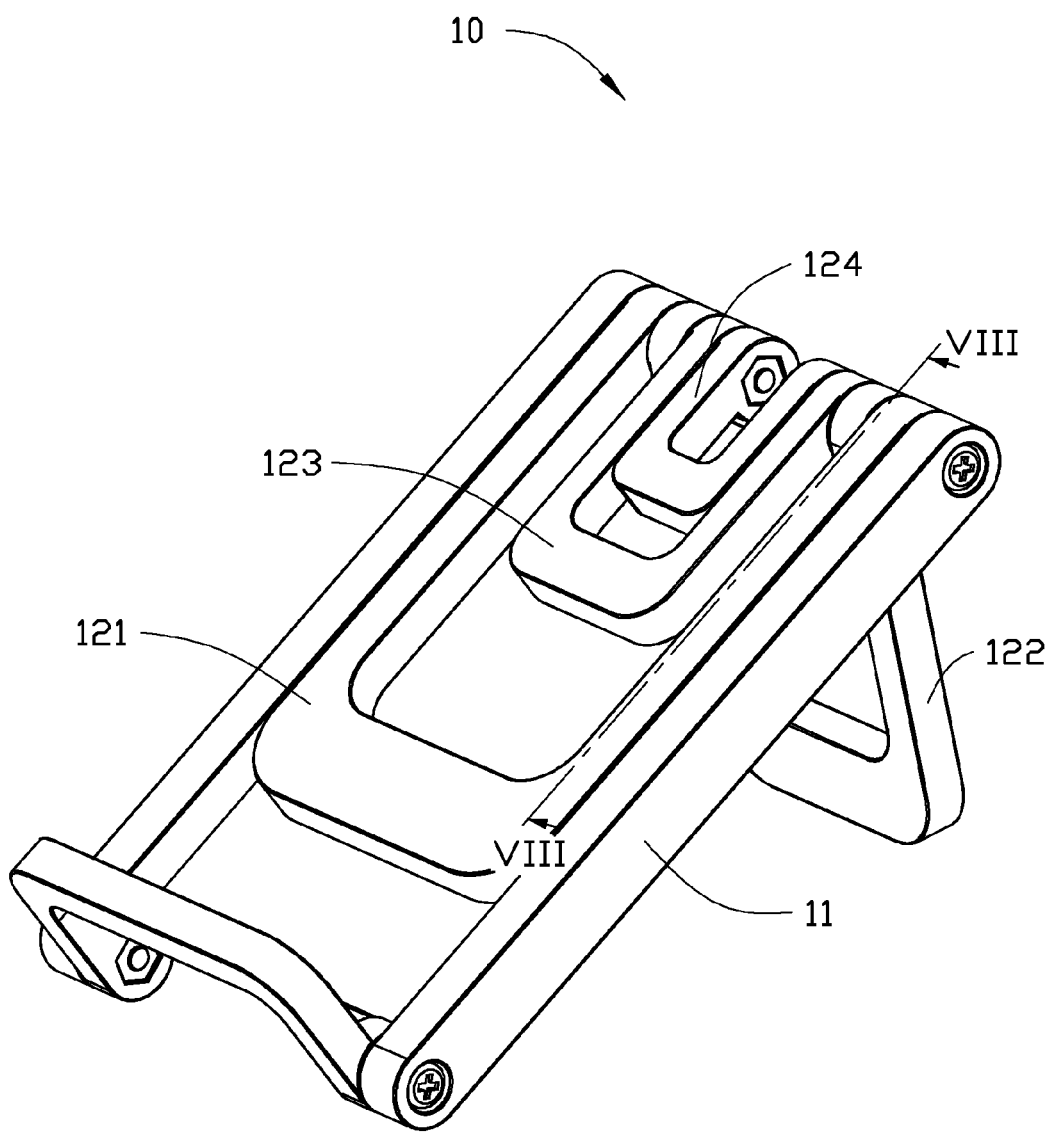
FIG. 7 is similar to FIG. 1, but showing the adjustable stand mechanism in a second supporting state.
Figure 8:
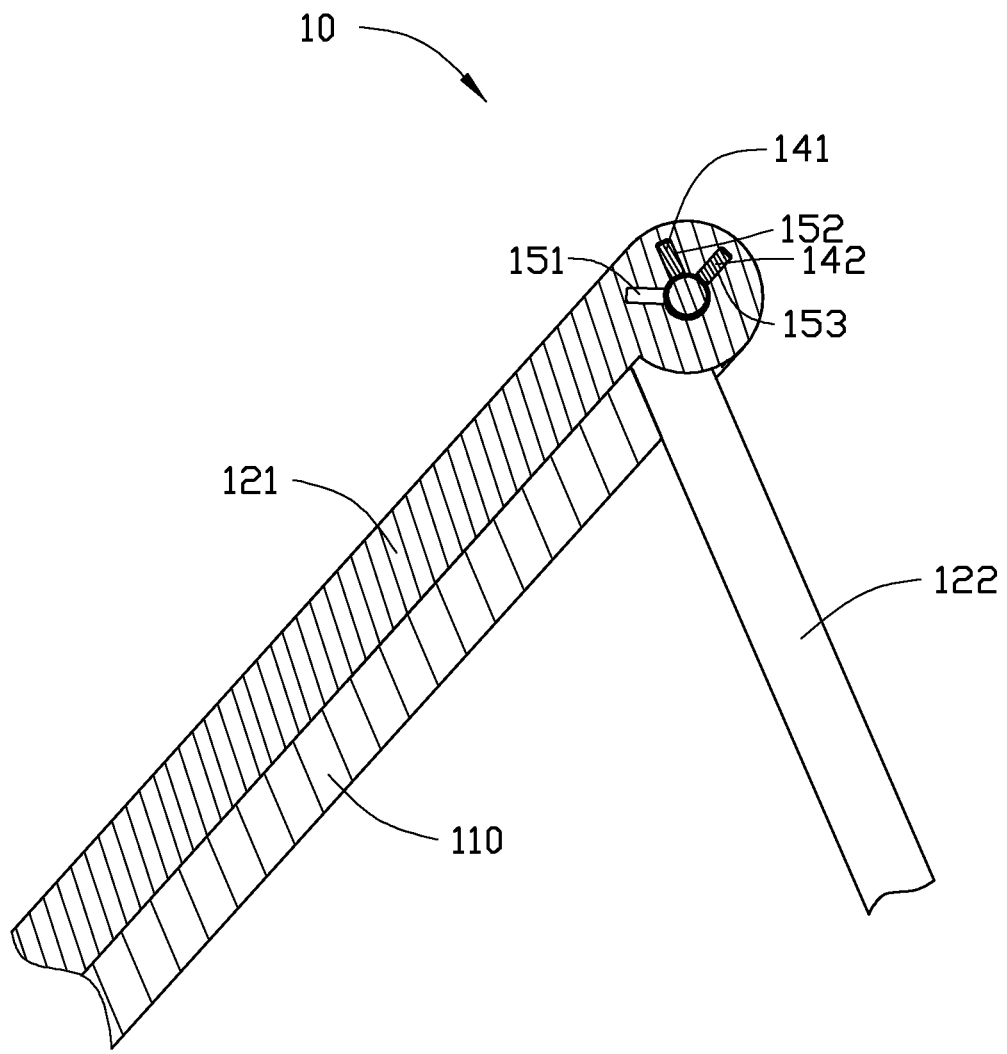
FIG. 8 is a side plan, cutaway view of part of the adjustable stand mechanism of FIG. 7, corresponding to line VIII-VIII thereof.

Referring to FIG. 7, this shows the adjustable stand mechanism 10 in a second supporting state. In the second supporting state, the second stand 122 is in the supporting state, and the other three stands 121, 123 and 124 are in the folded state. That is, the second stand 122 is unfolded out and supports the holding member 11, such that the holding member 11 provides a second inclined angle for the electronic device 20. Referring also to FIG. 8, each first protrusion 141 of the second stand 122 is received in the corresponding second groove 152 of the first stand 121, and each second protrusion 142 of the second stand 122 is received in the corresponding third groove 153 of the first stand 121. Moreover, the second grooves 152 of the second stand 122 receive the first protrusions 141 of the third stand 123, and the third grooves 153 of the second stand 122 receive the second protrusions 142 of the third stand 123. The first protrusions 141 of the fourth stand 124 are received in the first grooves 151 of the third stand 123, and the second protrusions 142 of the fourth stand 124 are received in the second grooves 152 of the third stand 123.

With regard to the third stand 123 and the fourth stand 124, these are able to be positioned so that the adjustable stand mechanism 10 is in a third supporting state or a fourth supporting state, respectively. In particular, when the third stand 123 or the fourth stand 124 is in the supporting state, and the other three stands 124, 121, 122 and/or 123 (as applicable) are in the folded state, the third stand 123 or the fourth stand 124 is folded out and supports the holding member 11, such that the holding member 11 provides a third inclined angle or a fourth inclined angle for the electronic device 20. In each of the third supporting state and the fourth supporting state, the detailed connections between the respective adjacent stands 121, 122, 123 and 124 correspond to and are much the same as those described above in relation to the first and second supporting states.

Figure 9:
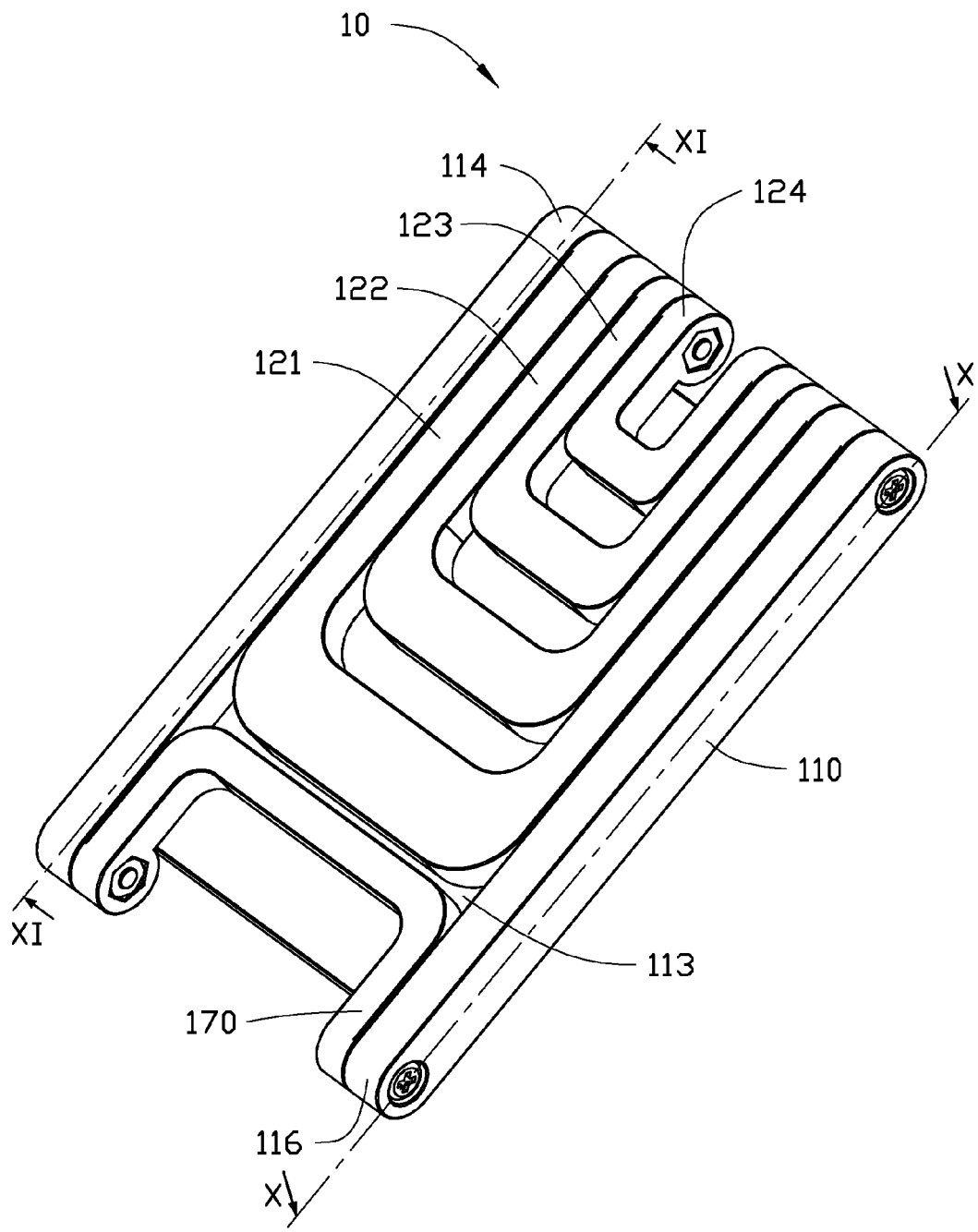
FIG. 9 is similar to FIG. 1, but showing the adjustable stand mechanism in a folded state.
Figure 10:
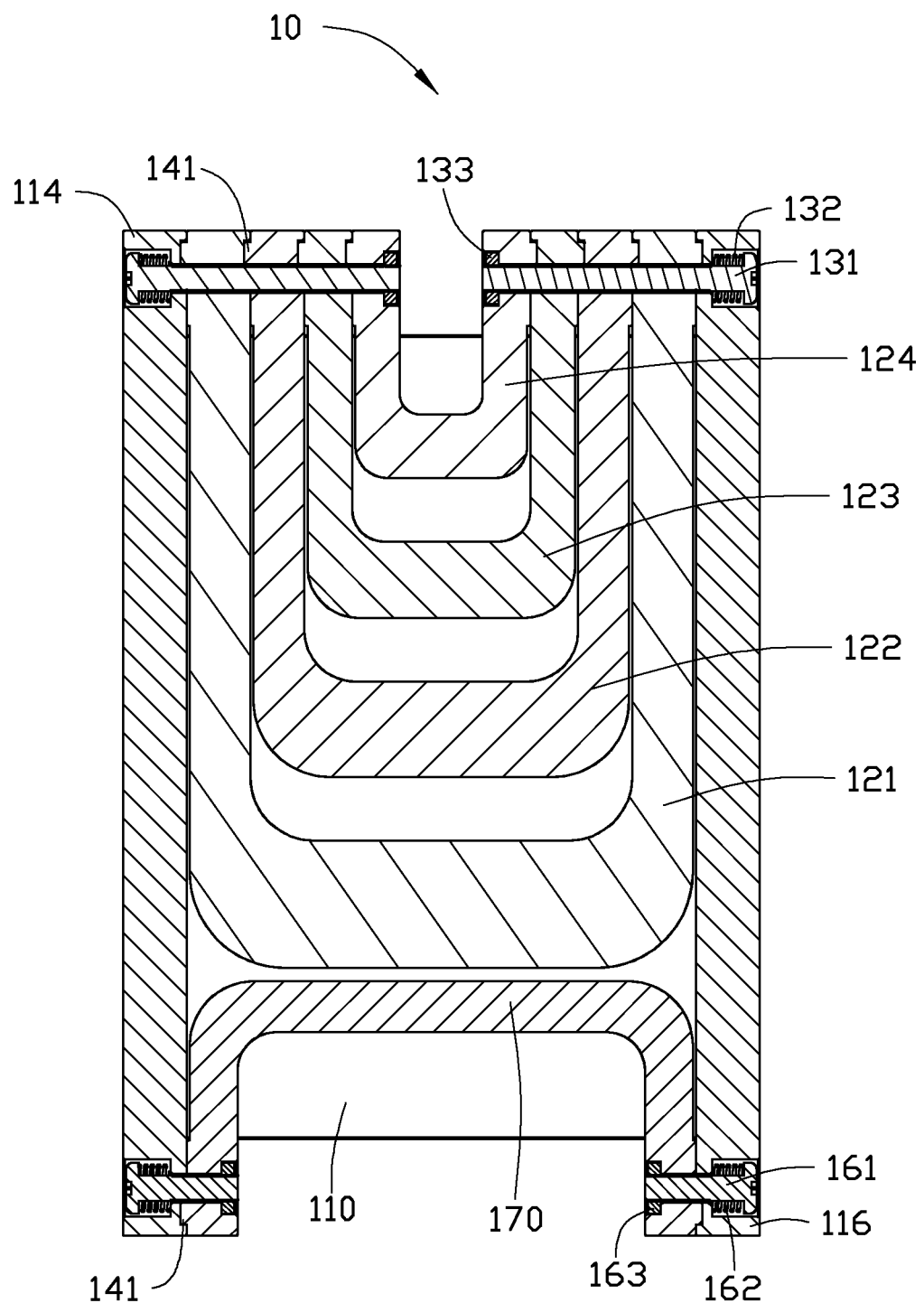
FIG. 10 is a top plan, cutaway view of the adjustable stand mechanism of FIG. 9, corresponding to line X-X thereof.
Figure 11:
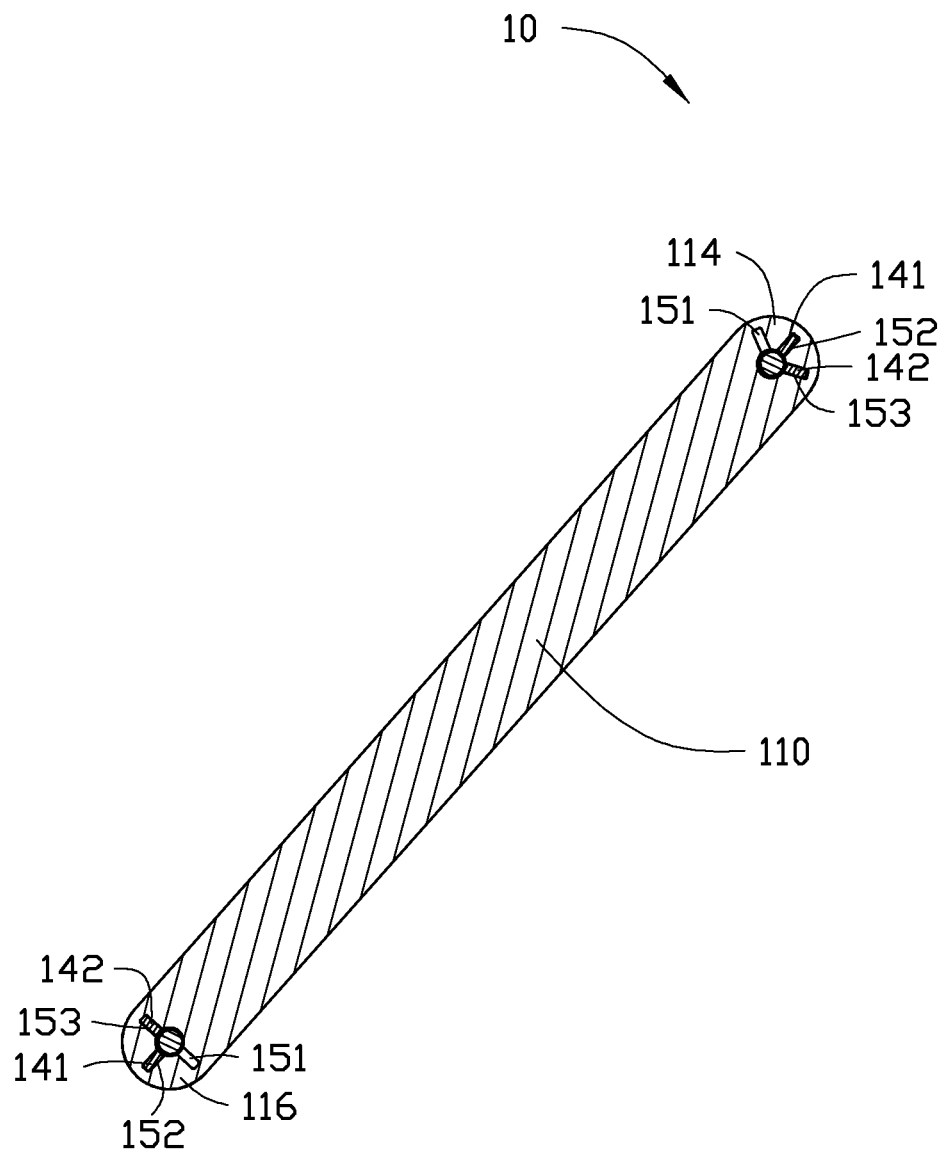
FIG. 11 is a cross-sectional view of the adjustable stand mechanism of FIG. 9, taken along line XI-XI thereof.

Referring to FIG. 9, when the adjustable stand mechanism 10 is in a folded state, the four stands 121, 122, 123 and 124 and the rest 170 are all in the folded state. The adjustable stand mechanism 10 in the folded state can be carried conveniently. Referring also to FIG. 10 and FIG. 11, when the adjustable stand mechanism 10 is in the folded state, the four stands 121, 122, 123 and 124 and the rest 170 are all received in the recess portion 113, the first protrusions 141 are received in the corresponding second grooves 152, and the second protrusions 141 are received in the corresponding third grooves 153.

In summary, the support member 12 has the four stands 121, 122, 123 and 124, which can provide four different inclined angles for the holding member 11. As such, a user can achieve a particular desired viewing angle for the electronic device 20 simply by changing the states of the four stands 121, 122, 123 and 124 supporting the holding member 11 accordingly.

It is to be further understood that even though numerous characteristics and advantages of preferred and exemplary embodiments have been set out in the foregoing description, together with details of the structures and functions of the embodiments, the disclosure is illustrative only; and changes may be made in detail, especially in matters of shape, size and arrangement of parts within the principles of the present disclosure to the full extent indicated by the broad general meaning of the terms in which the appended claims are expressed.

What is claimed is:

1. An adjustable stand mechanism for supporting an electronic device, the adjustable stand mechanism comprising:
   a holding member configured for holding the electronic device; and
   a support member configured for supporting the holding member at a selected one of different inclined angles, the support member comprising:
      a first stand rotatably engaged with the holding member, the first stand configured for selectably supporting the holding member and providing a first inclined angle for the holding member; and
      a second stand rotatably engaged with the holding member, the second stand configured for selectably supporting the holding member and providing a second inclined angle for the holding member which is different from the first inclined angle;
   wherein the holding member comprises a holding plate and a footstand connected with the holding plate, the holding plate configured for supporting a rear surface of the electronic device, and the footstand configured for supporting a bottom end of the electronic device so as to prevent the electronic device from sliding away from the holding plate, the holding plate comprises two supporting legs at two bottom corners thereof and two first engagement portions at two top corners thereof, the first stand and the second stand are rotatably engaged with the two first engagement portions, and the footstand is engaged with the two supporting legs, each of the first stand and the second stand has a supporting state and a folded state, the holding plate further comprises a front supporting surface and a rear surface at opposite sides thereof, and a recess portion is defined at the supporting surface and configured for receiving the first stand and the second stand when the first stand and the second stand are in the folded state, the first stand and the second stand are rotatably engaged with the two first engagement portions via at least one first shaft, each of the first stand and the second stand comprises a first U-shaped main body and two second engagement portions connected to two ends of the first U-shaped main body, each second engagement portion comprises a pivot hole, each first engagement portion comprises a pivot hole, the at least one first shaft comprises two first shafts, and each first shaft passes through the pivot hole of a corresponding first engagement portion, a corresponding pivot hole of the first stand, and a corresponding pivot hole of the second stand in series, the support member further comprises two first springs and two first nuts, each of the first shafts is a bolt, each of the first shafts bolts passes through a corresponding one of the first springs, the corresponding pivot hole of the first engagement portion, the corresponding pivot hole of the first stand, and the corresponding pivot hole of the second stand in series, and a corresponding one of the first nuts is fixed at the end of the first shaft.

2. The adjustable stand mechanism of claim 1, wherein a recess is defined at an external surface of each first engagement portion, and a head of the corresponding bolt and the corresponding first spring are received in the recess of each first engagement portion.

3. The adjustable stand mechanism of claim 1, wherein a first groove and a second groove are defined at an internal surface of each first engagement portion, a first protrusion is defined at an external surface of each second engagement portion of the first stand, the first protrusions of the first stand are received in the first grooves of the corresponding first engagement portions when the first stand is in the supporting state, and the first protrusions of the first stand are received in the second grooves of the corresponding first engagement portion when the first stand is in the folded state.

4. The adjustable stand mechanism of claim 3, wherein a third groove is defined at the internal surface of each first engagement portion, a second protrusion is defined at the external surface of each second engagement portion of the first stand, the second protrusions of the first stand are received in the second grooves of the corresponding first engagement portions when the first stand is in the supporting state, and the second protrusions of the first stand are received in the third grooves of the corresponding first engagement portions when the first stand is in the folded state.

5. The adjustable stand mechanism of claim 4, wherein a first groove, a second groove, and a third groove are defined at an internal surface of each second engagement portion of the first stand, a first protrusion and a second protrusion are defined at an external surface of each second engagement portion of the second stand, and when the first stand is in the supporting state and the second stand is in the folded state, the first protrusions and the second protrusions of the second stand are received in the corresponding second grooves and the corresponding third grooves of the first stand, respectively.

6. The adjustable stand mechanism of claim 5, wherein when the first stand is in the folded state and the second stand is in the supporting state, the first protrusions and the second protrusions of the second stand are received in the corresponding second grooves and the corresponding third grooves of the first stand, respectively; and when the first stand and the second stand are both in the folded state, the first protrusions and the second protrusions of the second stand are received in the corresponding first grooves and the corresponding second grooves of the first stand, respectively.

7. The adjustable stand mechanism of claim 1, wherein the footstand comprises a rest and at least one second shaft, and the rest is rotatably engaged with the two supporting legs via the at least one second shaft.

8. The adjustable stand mechanism of claim 7, wherein the rest has a supporting state and a folded state, the rest supporting the bottom end of the electronic device in the supporting state, and the rest being received in the recess portion in the folded state.

9. The adjustable stand mechanism of claim 8, wherein the rest comprises a second U-shaped main body and two third engagement portions, the two third engagement portions being connected with two ends of the second U-shaped main body, respectively, each third engagement portion comprises a pivot hole, each supporting leg comprises a pivot hole, the at least one second shaft comprises two second shafts, and each second shaft passes through the pivot hole of the corresponding supporting leg and the pivot hole of the corresponding third engagement portion in series.

10. The adjustable stand mechanism of claim 9, wherein the footstand further comprises two second springs and two second nuts, each second shaft is a bolt, each second shaft passes through a corresponding one of the second springs, the pivot hole of the corresponding supporting leg, and the pivot hole of the corresponding second engagement portion in series, and each of the second nuts is fixed at the end of a corresponding one of the second shafts.

11. The adjustable stand mechanism of claim 10, wherein a first groove and a second groove are defined at an internal surface of each supporting leg, a first protrusion is defined at an external surface of each second engagement portion, and the first protrusions of the second engagement portions are received in the first grooves of the corresponding supporting legs when the rest is in the supporting state.

12. The adjustable stand mechanism of claim 11, wherein a third groove is defined at the internal surface of each supporting leg, a second protrusion is defined at the external surface of each second engagement portion, the second protrusions of the second engagement portions are received in the second grooves of the corresponding supporting legs when the rest is in the supporting state, and the second protrusions of the second engagement portions are received in the third grooves of the corresponding supporting legs when the rest is in the folded state.

13. The adjustable stand mechanism of claim 1, wherein the support member further comprises a third stand rotatably engaged with the holding member, the third stand configured for selectably supporting the holding member and providing a third inclined angle for the holding member.

14. The adjustable stand mechanism of claim 13, wherein the support member further comprises a fourth stand rotatably engaged with the holding member, the fourth stand configured for selectably supporting the holding member and providing a fourth inclined angle for the holding member.

* * * * *